US008459110B2

(12) United States Patent
Cazzaniga et al.

(10) Patent No.: US 8,459,110 B2
(45) Date of Patent: Jun. 11, 2013

(54) INTEGRATED MICROELECTROMECHANICAL GYROSCOPE WITH IMPROVED DRIVING STRUCTURE

(75) Inventors: Gabriele Cazzaniga, Rosate (IT); Luca Coronato, Corsico (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 273 days.

(21) Appl. No.: 12/975,979

(22) Filed: Dec. 22, 2010

(65) Prior Publication Data

US 2011/0154898 A1 Jun. 30, 2011

(30) Foreign Application Priority Data

Dec. 24, 2009 (IT) .............................. TO2009A1042

(51) Int. Cl.
*G01C 19/56* (2012.01)
(52) U.S. Cl.
USPC ..................................... 73/504.12; 73/504.14
(58) Field of Classification Search
USPC .............. 73/504.12, 504.14, 504.02, 504.04, 73/504.03, 511
See application file for complete search history.

(56) References Cited

U.S. PATENT DOCUMENTS

| | | | |
|---|---|---|---|
| 5,728,936 A | 3/1998 | Lutz | 73/504.14 |
| 5,895,850 A | 4/1999 | Buestgens | 73/504.12 |
| 6,230,563 B1 | 5/2001 | Clark et al. | 73/504.04 |
| 6,250,156 B1 | 6/2001 | Seshia et al. | 73/504.12 |
| 6,349,597 B1 | 2/2002 | Folkmer et al. | |
| 6,520,017 B1 | 2/2003 | Schoefthaler et al. | |
| 6,766,689 B2 * | 7/2004 | Gardella et al. | 73/504.04 |
| 7,155,976 B2 * | 1/2007 | Kai-Cheng et al. | 73/504.04 |
| 7,284,429 B2 * | 10/2007 | Chaumet et al. | 73/504.12 |
| 7,454,246 B2 | 11/2008 | Merfeld | |
| 7,461,552 B2 * | 12/2008 | Acar | 73/504.04 |

(Continued)

FOREIGN PATENT DOCUMENTS

DE 102007012163 10/2007
DE 102006046772 4/2008

(Continued)

OTHER PUBLICATIONS

Schofield, A.R. et al., "Multi-Degree of Freedom Tuning Fork Gyroscope Demonstrating Shock Rejection," IEEE Sensors 2007 Conference, Atlanta, Georgia, Oct. 28-31, 2007, pp. 120-123.

(Continued)

*Primary Examiner* — Helen Kwok
(74) *Attorney, Agent, or Firm* — Seed IP Law Group PLLC (57) ABSTRACT

An integrated MEMS gyroscope, is provided with: at least a first driving mass driven with a first driving movement along a first axis upon biasing of an assembly of driving electrodes, the first driving movement generating at least one sensing movement, in the presence of rotations of the integrated MEMS gyroscope; and at least a second driving mass driven with a second driving movement along a second axis, transverse to the first axis, the second driving movement generating at least a respective sensing movement, in the presence of rotations of the integrated MEMS gyroscope. The integrated MEMS gyroscope is moreover provided with a first elastic coupling element, which elastically couples the first driving mass and the second driving mass in such a way as to couple the first driving movement to the second driving movement with a given ratio of movement.

27 Claims, 5 Drawing Sheets

U.S. PATENT DOCUMENTS

| | | | |
|---|---|---|---|
| 8,256,290 B2 * | 9/2012 | Mao | 73/504.12 |
| 2002/0183899 A1 | 12/2002 | Wallner | 701/1 |
| 2002/0189351 A1 | 12/2002 | Reeds et al. | 73/504.04 |
| 2002/0189352 A1 | 12/2002 | Reeds, III et al. | 73/504.04 |
| 2002/0189353 A1 | 12/2002 | Knowles et al. | 73/504.12 |
| 2003/0164040 A1 | 9/2003 | Willig et al. | 73/504.02 |
| 2004/0211257 A1 | 10/2004 | Geen | 73/504.04 |
| 2004/0211258 A1 | 10/2004 | Geen | 73/510 |
| 2005/0050954 A1 | 3/2005 | Chaumet et al. | 73/504.12 |
| 2005/0229703 A1 | 10/2005 | Geen et al. | 73/510 |
| 2006/0032310 A1 | 2/2006 | Merassi et al. | |
| 2006/0112764 A1 | 6/2006 | Higuchi | 73/504.12 |
| 2006/0272411 A1 | 12/2006 | Acar et al. | 73/504.04 |
| 2007/0062282 A1 * | 3/2007 | Akashi et al. | 73/504.12 |
| 2007/0131030 A1 * | 6/2007 | Jeong et al. | 73/504.12 |
| 2007/0214883 A1 | 9/2007 | Durante et al. | 73/504.04 |
| 2007/0289382 A1 | 12/2007 | Caminada et al. | 73/504.12 |
| 2008/0115562 A1 | 5/2008 | Haino et al. | |
| 2008/0190200 A1 | 8/2008 | Caminada et al. | 73/504.12 |
| 2008/0276706 A1 * | 11/2008 | Hartmann et al. | 73/504.04 |
| 2009/0064780 A1 | 3/2009 | Coronato et al. | 73/504.08 |
| 2009/0100930 A1 | 4/2009 | Coronato et al. | 73/504.12 |
| 2010/0116050 A1 * | 5/2010 | Wolfram | 73/504.12 |
| 2010/0126269 A1 | 5/2010 | Coronato et al. | 73/504.04 |
| 2010/0126272 A1 | 5/2010 | Coronato et al. | 73/504.14 |
| 2010/0132463 A1 | 6/2010 | Caminada et al. | 73/504.12 |
| 2010/0154541 A1 | 6/2010 | Cazzaniga et al. | 73/504.12 |
| 2010/0186507 A1 | 7/2010 | Günthner et al. | |
| 2010/0263446 A1 * | 10/2010 | Tamura et al. | 73/504.12 |
| 2010/0281977 A1 | 11/2010 | Coronato et al. | 73/504.14 |
| 2011/0030473 A1 * | 2/2011 | Acar | 73/504.12 |
| 2011/0061460 A1 * | 3/2011 | Seeger et al. | 73/504.12 |
| 2012/0060604 A1 * | 3/2012 | Neul et al. | 73/504.12 |

FOREIGN PATENT DOCUMENTS

| | | | |
|---|---|---|---|
| DE | 10 2007 054 505 | * | 5/2009 |
| EP | 1619471 | | 1/2006 |
| EP | 1624286 | | 2/2006 |
| EP | 1832841 | | 9/2007 |
| JP | 2005/241500 | | 9/2005 |
| WO | 2006/043890 | | 4/2006 |
| WO | 2007/086849 | | 8/2007 |
| WO | 2007/145113 | | 12/2007 |
| WO | 2009/033915 | | 3/2009 |
| WO | 2009/087858 | | 7/2009 |

OTHER PUBLICATIONS

U.S. Appl. No. 12/792,599, Prandi et al.

* cited by examiner

INTEGRATED MICROELECTROMECHANICAL GYROSCOPE WITH IMPROVED DRIVING STRUCTURE

BACKGROUND

1. Technical Field

The present disclosure relates to an integrated microelectromechanical gyroscope, in particular of a triaxial type, with an improved driving structure.

2. Description of the Related Art

As is known, current micromachining techniques enable production of microelectromechanical systems (MEMS) starting from layers of semiconductor material, which have been deposited (for example, a layer of polycrystalline silicon) or grown (for example, an epitaxial layer) on sacrificial layers, which are removed via chemical etching. Inertial sensors, accelerometers and gyroscopes obtained with this technology are encountering an increasing success, for example, in the automotive field, in inertial navigation, or in the field of portable devices.

In particular, integrated gyroscopes made of semiconductor material obtained with MEMS technology are known. These gyroscopes operate based on the theorem of relative accelerations, exploiting the Coriolis acceleration. When a rotation at a certain angular velocity (the value of which is to be detected) is applied to a mobile mass that is driven with a linear velocity, the mobile mass "feels" an apparent force, called the "Coriolis force", which determines a displacement thereof in a direction perpendicular to the direction of the linear driving velocity and to the axis about which the rotation occurs. The mobile mass is supported via elastic elements that enable a displacement thereof in the direction of the apparent force. According to Hooke's law, the displacement is proportional to the apparent force, in such a way that, from the displacement of the mobile mass, it is possible to detect the Coriolis force and the value of the angular velocity of the rotation that has generated it. The displacement of the mobile mass can, for example, be detected in a capacitive way, determining, in a condition of resonance, the capacitance variations caused by the movement of mobile sensing electrodes, which are fixed with respect to the mobile mass and are coupled (for example, in the so-called "parallel-plate" configuration, or else in a combfingered configuration) to fixed sensing electrodes.

MEMS gyroscopes generally have a symmetrical sensing structure, comprising a pair of sensing masses for each sensing axis about which it is possible to detect a rotation at a corresponding angular velocity. Ideally, an altogether symmetrical structure enables complete rejection, by using appropriate differential reading schemes, of externally applied linear accelerations of disturbance, for example due to shocks acting on the sensor or to the acceleration of gravity. In fact, whereas the Coriolis force tends to unbalance in opposite directions and substantially by the same amount the sensing masses of each pair (generating movements "in phase opposition"), external interferential accelerations of disturbance determine displacements thereof in the same direction and once again by the same amount (generating movements "in phase"); by subtracting the electrical signals associated to the two sensing masses of each pair it is ideally possible to measure the contribution due to the Coriolis force and to completely reject the contributions of the accelerations of disturbance.

MEMS gyroscopes moreover have a driving structure, which is mechanically coupled to the sensing structure, in such a way as to impart upon the sensing masses a linear driving velocity along a corresponding driving direction; the driving structure is set in motion by means of driving electrodes, which receive appropriate electrical biasing signals from an electronic driving circuit of the MEMS gyroscope. In particular, the biasing signals are such as to cause, by means of mutual and alternating attraction of the driving electrodes associated to a given driving mass, self-oscillation of the same driving mass in the corresponding driving direction, at a given frequency of oscillation (corresponding to the frequency of mechanical resonance of the driving mass).

The electronic driving circuit of the MEMS gyroscope comprises, in a known way, a complex feedback control loop for imparting the motion on the driving masses and controlling the resultant driving motion thereof (in particular, the frequency and amplitude of the corresponding oscillation), by means of feedback sensing structures (in particular, driving-sensing electrodes, which are designed to measure, through a variation of transduced charge, the displacement of the driving mass in the driving direction).

In general, and as described, for example, in U.S. patent application Ser. No. 12/792,599 filed on Jun. 3, 2010, which is incorporated by reference herein, for each driving direction, the electronic driving circuit comprises a respective feedback control loop, constituted, amongst other elements, by charge-amplifier blocks, phase retarders, filters, oscillators, variable-gain amplifiers, PLL (phase-locked loop) stages, and, as a whole, is able to control driving of the driving masses in the corresponding driving direction.

It is hence evident that design and implementation of a microelectromechanical gyroscope are particularly complex, both as regards the micromechanical part and as regards the associated driving and reading electronics. In particular, as regards driving of a triaxial gyroscope, the requirement of envisaging a number of control loops (one for each driving direction) entails in general a considerable amount of resources and an associated high occupation of area in an integrated implementation. In addition, it is generally complex to maintain the desired ratios between frequency, phase, and amplitude of the oscillations of the driving masses in the various driving directions.

BRIEF SUMMARY

The present disclosure is directed to a microelectromechanical gyroscope with improved electromechanical characteristics, in particular as regards the corresponding driving structure.

In one embodiment of the present disclosure an integrated MEMS gyroscope is provided that includes an assembly of driving electrodes, a first driving mass, configured to be driven to have a first driving movement along a first axis in response to the assembly of driving electrodes, said first driving movement being configured to generate a first sensing movement, in response to rotations of said integrated MEMS gyroscope, a second driving mass, configured to be driven to have a second driving movement along a second axis in response to the assembly of driving electrodes, said second axis being transverse to said first axis, said second driving movement being configured to generate a second sensing movement, in response to the rotations of said integrated MEMS gyroscope, and a first elastic coupling element, configured to elastically couple said first driving mass and said second driving mass and to couple said first driving movement to said second driving movement with a given ratio of movement.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein.

DETAILED DESCRIPTION

As will be described in detail hereinafter, an aspect of the present disclosure envisages providing an integrated MEMS gyroscope in which a mechanical elastic coupling is provided between at least a first driving mass, which is to move in a first driving direction, and at least a second driving mass, which is to move in a second driving direction, transverse to the first driving direction, in such a way that the first and second driving masses move in a synchronous way with respect to one another and with a given phase relation. As will be described in detail hereinafter, the presence of at least two driving masses, which move with respect to one another in two driving directions transverse to one another, enables sensing of angular velocities about three axes of a cartesian reference system (fixed with respect to the MEMS gyroscope). The presence of elastic coupling elements between the driving masses enables exploitation of a single driving motion for moving all the mobile masses of the microelectromechanical structure, and hence implementation of a single feedback control loop, for control of the driving motion.

Figure 1:
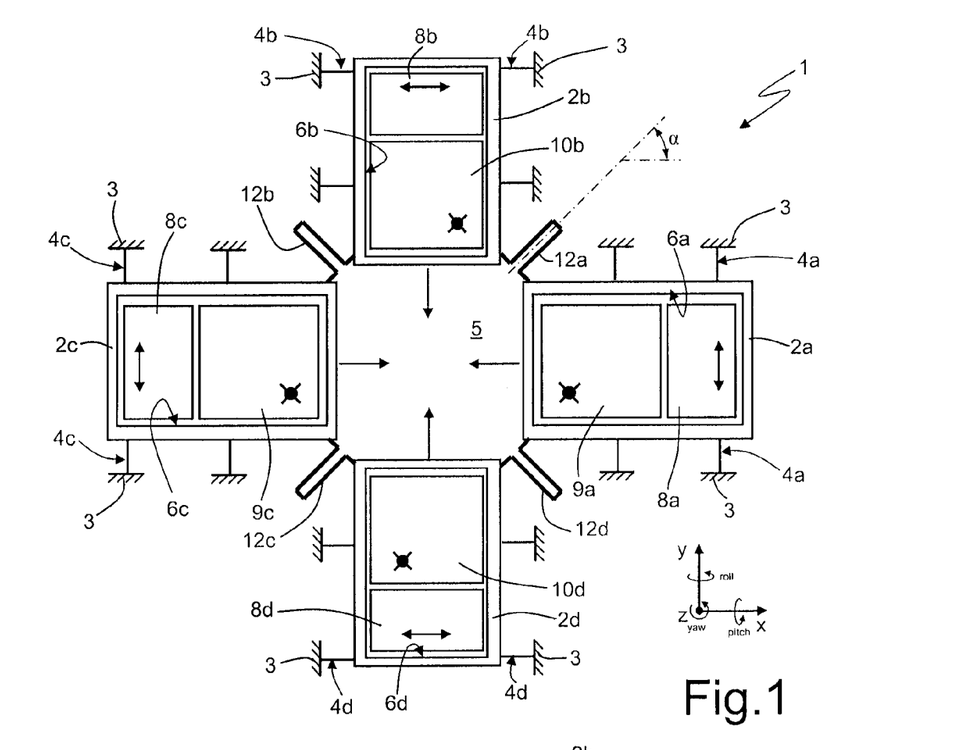
FIG. 1 shows a schematic and simplified top plan view of a microelectromechanical structure of a MEMS gyroscope, according to one aspect of the present disclosure.

In greater detail, and with reference to the schematic representation of FIG. 1, a micromechanical structure of a triaxial MEMS gyroscope, here designated by 1, comprises: a first driving mass 2a, anchored to a substrate 3 (here illustrated schematically) by means of first elastic anchorage elements 4a in such a way as to be free to move with translatory linear motion in a first driving direction (the directions of movement are represented by arrows in FIG. 1), along a first horizontal axis x about which in use a rotation at a pitch angular velocity is detected; a second driving mass 2b, anchored to the substrate 3 by means of second elastic anchorage elements 4b in such a way as to be free to move with translatory linear motion in a second driving direction, along a second horizontal axis y, orthogonal to the first horizontal axis x, about which in use a rotation at a roll angular velocity is detected; a third driving mass 2c, which is anchored to the substrate 3 by means of third elastic anchorage elements 4c in such a way as to be free to move with translatory linear motion in the first driving direction, along the first horizontal axis x, and is aligned to the first driving mass 3a along the same first horizontal axis x to form a first pair of driving masses; and a fourth driving mass 2d, which is anchored to the substrate 3 by means of fourth elastic anchorage elements 4d in such a way as to be free to move with translatory linear motion in the second driving direction, along the second horizontal axis y, and is aligned to the second driving mass 2b along the same second horizontal axis y to form a second pair of driving masses. In particular, the driving masses of one and the same pair are driven so as to move in phase opposition with respect to one another (in this way giving rise to corresponding sensing movements in phase opposition for sensing angular velocities, as will be described in detail in what follows).

In the illustrated embodiment, the driving masses 2a-2d are generically arranged at the ends of a cross, defining at the center an empty space 5. In addition, each of the driving masses 2a-2d has, in a horizontal plane xy defined by the first horizontal axis x and by the second horizontal axis y, a frame conformation, inside which is a respective housing opening 6a-6d (as described in what follows, this conformation is not, however, the only possible one for the same driving masses 2a-2d).

As illustrated schematically in FIG. 1, each driving mass 2a-2d can enclose inside it, arranged at least partially in the respective housing opening 6a-6d, one or more sensing masses, designed for sensing the angular velocities at which the MEMS gyroscope 1 is set in rotation. The sensing masses are mechanically connected to the respective driving masses 2a-2d via respective elastic elements (here not illustrated), which are rigid in regard to the driving motion of the driving masses 2a-2d in such a way as to be carried along in their linear driving motion. In addition, each sensing mass is able to move in at least one sensing direction, preferably in a way substantially uncoupled from the respective driving mass 2a-2d, in order to detect a respective angular velocity (hence having at least one further degree of freedom of movement).

In particular, in the embodiment illustrated in FIG. 1, each driving mass 2a-2d is coupled to a respective yaw-sensing mass 8a-8d, which is connected via respective elastic elements (here not illustrated) to the frame of the respective driving mass 2a-2d in such a way as to be free to move in a sensing direction orthogonal to the driving motion of the respective driving mass 2a-2d (consequently, along the second horizontal axis y, if it is coupled to the first driving mass 2a or to the third driving mass 2c, and along the first horizontal axis x, if it is coupled to the second driving mass 2b or to the fourth driving mass 2d), as a result of the Coriolis force generated by a yaw angular velocity acting about a vertical axis z (orthogonal to the horizontal plane xy). The displacement of each yaw-sensing mass 8a-8d is detected by means of a yaw electrode structure (here not illustrated), arranged in such a way as to form in the horizontal plane xy a parallel-plate capacitive structure, the capacitance of which varies as a function of the displacement of the yaw-sensing mass 8a-8d (and consequently as a function of the yaw angular velocity that is to be detected).

The first and third driving masses 2a, 2c are moreover coupled to a respective roll-sensing mass 9a, 9c, which is connected via respective elastic elements (here not illustrated) to the frame of the respective driving mass 2a, 2c, in such a way as to be free to move in a sensing direction along the vertical axis z as a result of the Coriolis force generated by a rotation at a roll angular velocity about the second horizontal axis y. The displacement of each roll-sensing mass 9a, 9c is detected by means of a roll electrode structure (here not illustrated), arranged underneath the roll-sensing mass 9a, 9c (in particular constituted by one or more electrodes set on the substrate 3, and fixedly coupled thereto), so as to form a parallel-plate capacitive structure, the capacitance of which varies as a function of the roll angular velocity that is to be detected.

The second and fourth sensing masses 2b, 2d are moreover coupled to a respective pitch-sensing mass 10b, 10d, which is connected via respective elastic elements (here not illustrated) to the frame of the respective driving mass 2b, 2d in such a way as to be free to move in a sensing direction along the vertical axis z as a result of the Coriolis force generated by a rotation at a pitch angular velocity acting about the first horizontal axis x. The displacement of each pitch-sensing mass 10b, 10d is detected by means of a pitch electrode structure (here not illustrated), which is also set underneath the respective pitch-sensing mass 10b, 10d so as to form a respective parallel-plate capacitive structure, with a capacitance that varies as a function of the pitch angular velocity that is to be detected.

It is to be noted that in other embodiments of the micromechanical structure of the MEMS gyroscope 1, some of which will be described in what follows, only two yaw-sensing masses may be present (for example, the ones housed in the respective housing openings 6a, 6c of the first and third driving masses 2a, 2c). Alternatively, some of the sensing masses, instead of being distinct, may coincide; i.e., they may be able to move in several sensing directions thanks to the configuration of the respective elastic supporting elements (for example, the yaw-sensing and roll-sensing masses set within the first and third driving masses 2a, 2c aligned along the first horizontal axis x could coincide and be constituted by a single sensing mass able to move both along the vertical axis z and along the second horizontal axis y). In addition, the driving masses 2a-2d could themselves coincide with one or more of the sensing masses, hence be free to move both in the driving direction and in one or more of the sensing directions, thanks to the particular conformation of the associated elastic anchorage elements 4a-4d.

A particular aspect of the present disclosure envisages in any case the presence of elastic coupling elements, such as to couple mechanically to one another driving masses that move in different driving directions; the elastic coupling elements are such as to ensure that all the driving masses move in a synchronous way (with a given phase), and moreover that the driving masses referred to one and the same driving direction move in phase opposition with respect to one another (i.e., in opposite senses of the same driving direction).

In detail, the MEMS gyroscope 1 comprises: a first elastic coupling element 12a, configured so as to elastically couple the first driving mass 2a and the second driving mass 2b so that, a movement of the first driving mass 2a along the first horizontal axis x, is associated (with a given movement ratio) with a corresponding movement of the second driving mass 2b along the second horizontal axis y; a second elastic coupling element 12b, configured so as to couple elastically the second driving mass 2b and the third driving mass 2c so that, a movement of the third driving mass 2c along the first horizontal axis x, is associated (with a respective movement ratio) with a corresponding movement of the second driving mass 2b along the second horizontal axis y; a third elastic coupling element 12c, configured so as to couple elastically the third driving mass 2c and the fourth driving mass 2d so that, a movement of the third driving mass 2c along the first horizontal axis x, is associated (with a respective movement ratio) with a corresponding movement of the fourth driving mass 2d along the second horizontal axis y; and a fourth elastic coupling element 12d, configured so as to couple elastically the fourth driving mass 2d and the first driving mass 2a so that, a movement of the first driving mass 2a along the first horizontal axis x, is associated (with a respective movement ratio) with a corresponding movement of the fourth driving mass 2d along the second horizontal axis y.

Each elastic coupling element 12a-12d is constituted by a spring of a folded type, which extends between two facing sides of the driving masses mechanically coupled by the same spring, and has an axis of extension inclined by a certain inclination angle α with respect to the first horizontal axis x. The elastic coupling elements 12a-12d are such as to transmit a relative movement between the coupled driving masses along the axis of extension, whereas they are ideally infinitely rigid in a direction orthogonal to the same axis of extension.

In particular, the inclination angle α determines the ratio between the amount of the displacements of the coupled driving masses. Advantageously, this inclination angle α is 45° so as to determine a substantially one-to-one ratio between these displacements (i.e., in such a way that to a displacement of a given driving mass there substantially corresponds a like displacement of the driving mass coupled thereto). Evidently, not only can the value of the inclination angle α vary with respect to the value of 45°, but a different value of the inclination angle α may even be envisaged for one or more of the elastic coupling elements 12a-12d (for example, for determining a different coupling ratio of the driving movements in the various driving directions). In addition, in a real case (in which the stiffness of the elastic elements is not infinite), it is possible to vary the ratio between the movements of the coupled driving masses also by appropriately modifying the elastic anchorage elements 4a-4d; in any case, the most convenient method for varying the ratio of movement is that of varying the inclination angle α.

In the embodiment illustrated in FIG. 1, the first and third elastic coupling elements 12a, 12c have the same axis of extension, inclined by the inclination angle α, which is positive, with respect to the first horizontal axis x. Likewise, the second and fourth elastic coupling elements 12b, 12d have the same axis of extension, but inclined by the inclination angle α, which is negative, with respect to the same first horizontal axis x.

In greater detail, and as represented by the arrows in FIG. 1, this arrangement of the elastic coupling elements 12a-12d is such that an approaching movement of the driving masses 2a, 2c of the first pair along the first horizontal axis x is associated to an approaching movement of the driving masses 2b, 2d of the second pair along the second horizontal axis y; in other words, the driving movements along the first and second horizontal axes x, y are in phase with respect to one another (the movements of the driving masses of one and the same pair being in any case always in phase opposition with respect to one another). Of course, also other types of elastic coupling elements may be provided, which are able to implement the same function of constraining the movement of the driving masses 2a (2c) along the first horizontal axis x to the movement of the driving masses 2b (2d) along the second horizontal axis y, according to a pre-set movement ratio.

With a different configuration of the elastic coupling elements 12a-12d and/or the elastic anchorage elements 4a-4d of each of the driving masses 2a-2d, it is moreover possible to implement different ratios between the driving movements of the various driving masses 2a-2d, all of which are in any case distinguished by the fact that the driving masses 2a-2d move in a synchronous way and those for one and the same driving direction in phase opposition with respect to one another.

Figure 2:
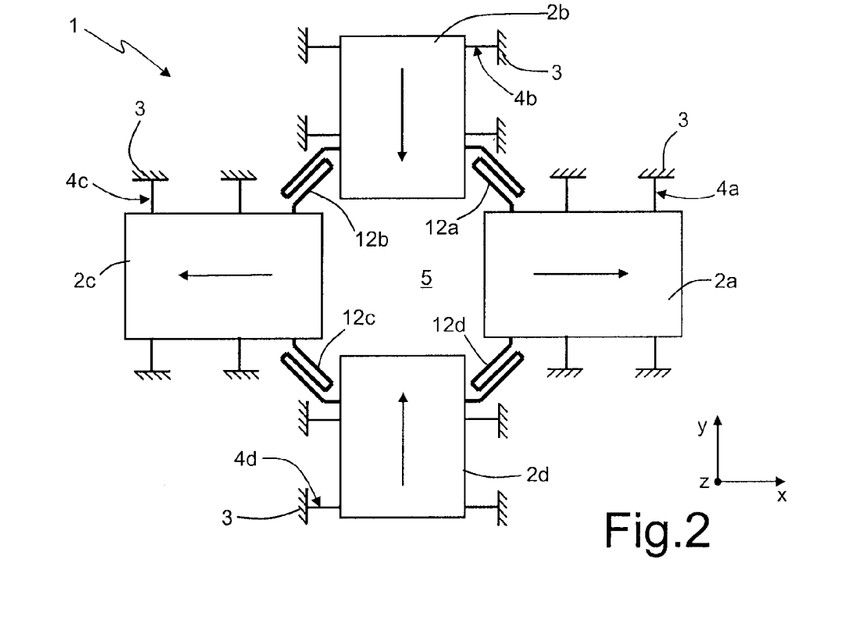
FIGS. 2-4 show schematic and simplified top plan views of the microelectromechanical structure of the MEMS gyroscope, according to variants of the present disclosure.

In detail, and with reference to the schematic and simplified representation of FIG. 2 (which for simplicity of illustration shows only the driving masses, and not the corresponding sensing masses), by rotating through 90° the axis of extension of the elastic coupling elements 12a-12d (or, more in general, by inverting the sign of the corresponding inclination angle α) it is possible to obtain a movement of the driving masses 2a-2d opposite with respect to the situation described previously. In this case, the arrangement of the elastic coupling elements 12a-12d is such that a movement of the driving masses 2a, 2c of the first pair away from each other along the first horizontal axis x is associated to a corresponding approaching movement of the driving masses 2b, 2d of the second pair along the second horizontal axis y; the driving movements along the first and second horizontal axes x, y are in phase opposition with respect to one another.

A further type of driving movement, which can be used for detecting angular velocities along three axes, envisages a translatory movement of the driving masses 2a-2d orthogonal to the one illustrated previously. In this case, as shown in FIG. 3, the first and third driving masses 2a, 2c of the first pair, aligned along the first horizontal axis x, are constrained, by the corresponding first and third elastic anchorage elements 4a, 4c to move along the second horizontal axis y, whilst the second and fourth driving masses 2b, 2d of the second pair, aligned along the second horizontal axis y, are constrained, by the corresponding second and fourth elastic anchorage elements 4b, 4d to move along the first horizontal axis x.

Figure 3:
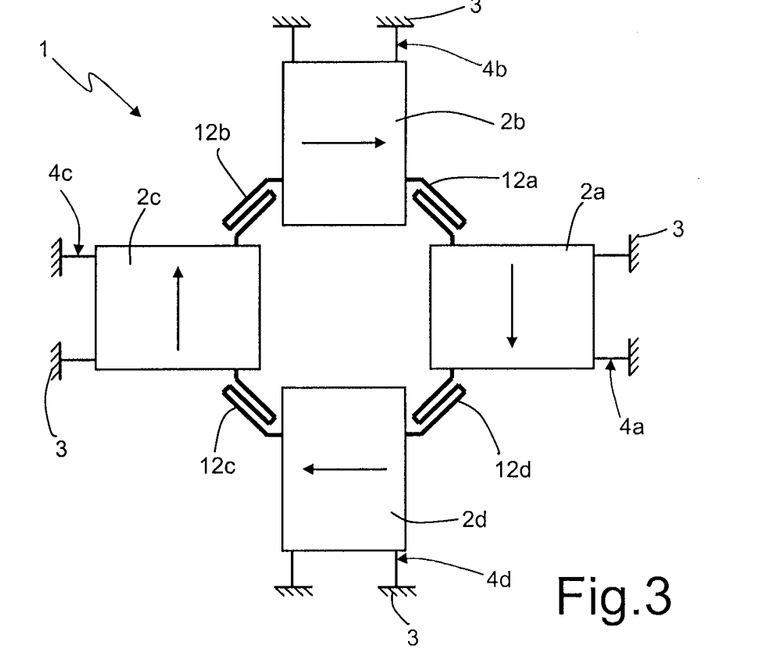

In particular, the arrangement of the elastic coupling elements 12a-12d illustrated in FIG. 3 is such that the driving movements along the first and second horizontal axes x, y are in phase with respect to one another.

Figure 4:
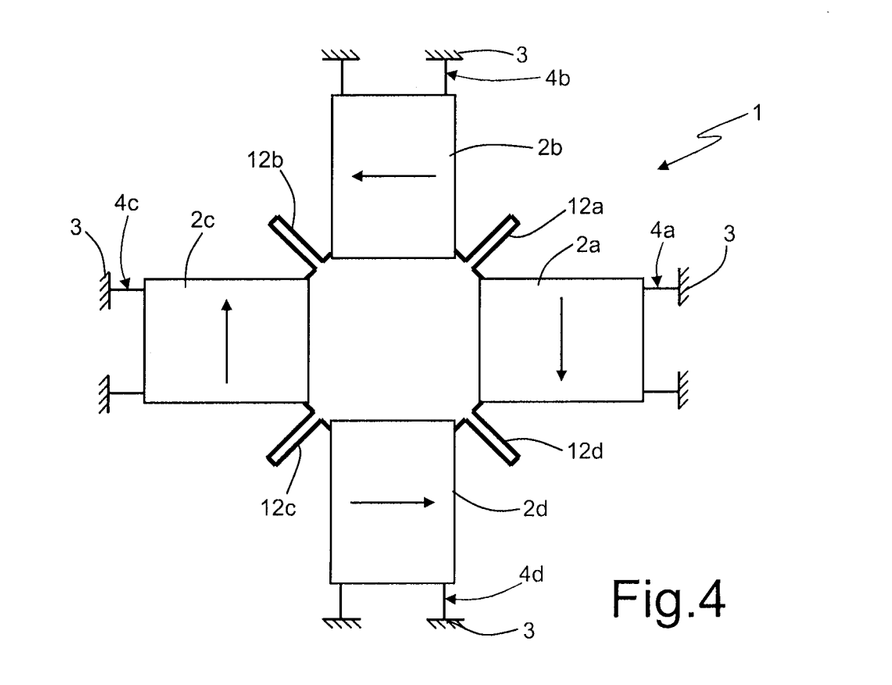

Instead, in a way that is evident in the light of the foregoing discussion, the arrangement of the elastic coupling elements 12a-12d illustrated in FIG. 4 is such that the driving movements along the first and second horizontal axes x, y are in phase opposition with respect to one another.

It should be noted in any case that, thanks to the presence of the elastic coupling elements 12a-12d, a single driving movement is sufficient to set in motion all the driving masses 2a-2d, and the associated sensing masses, and hence enable sensing of the angular velocities of yaw, roll, and pitch (and hence implementation of a triaxial gyroscope). In particular, the micromechanical structure described enables use of a single forcing loop for keeping all the driving masses 2a-2d in motion. Accordingly, it is, for example, sufficient to couple appropriate driving electrodes to only one of the pairs of driving masses (for example, the pair constituted by the first and third driving masses 2a, 2c moved along the first horizontal axis x) in so far as the driving masses of the other pair are set in motion (drawn along) by means of the elastic coupling elements 12a-12d.

Some constructional diagrams or layouts of the MEMS gyroscope 1 will now be described in greater detail. In these layouts a sensing coupling structure is moreover provided, which is arranged centrally in the empty space 5 for connecting the various sensing masses mechanically to one another, substantially as described in the U.S. patent application Ser. No. 12/776,178 filed on May 7, 2010, which is incorporated by reference herein. As illustrated in detail in this patent application, the sensing coupling structure is configured so as to only allow sensing movements in phase opposition of the sensing masses of a same pair (i.e., referred to sensing of the same angular velocity), which are required for reading of the corresponding angular velocities, and for blocking instead the movements in phase of the same sensing masses, due to external disturbance.

Figure 5:
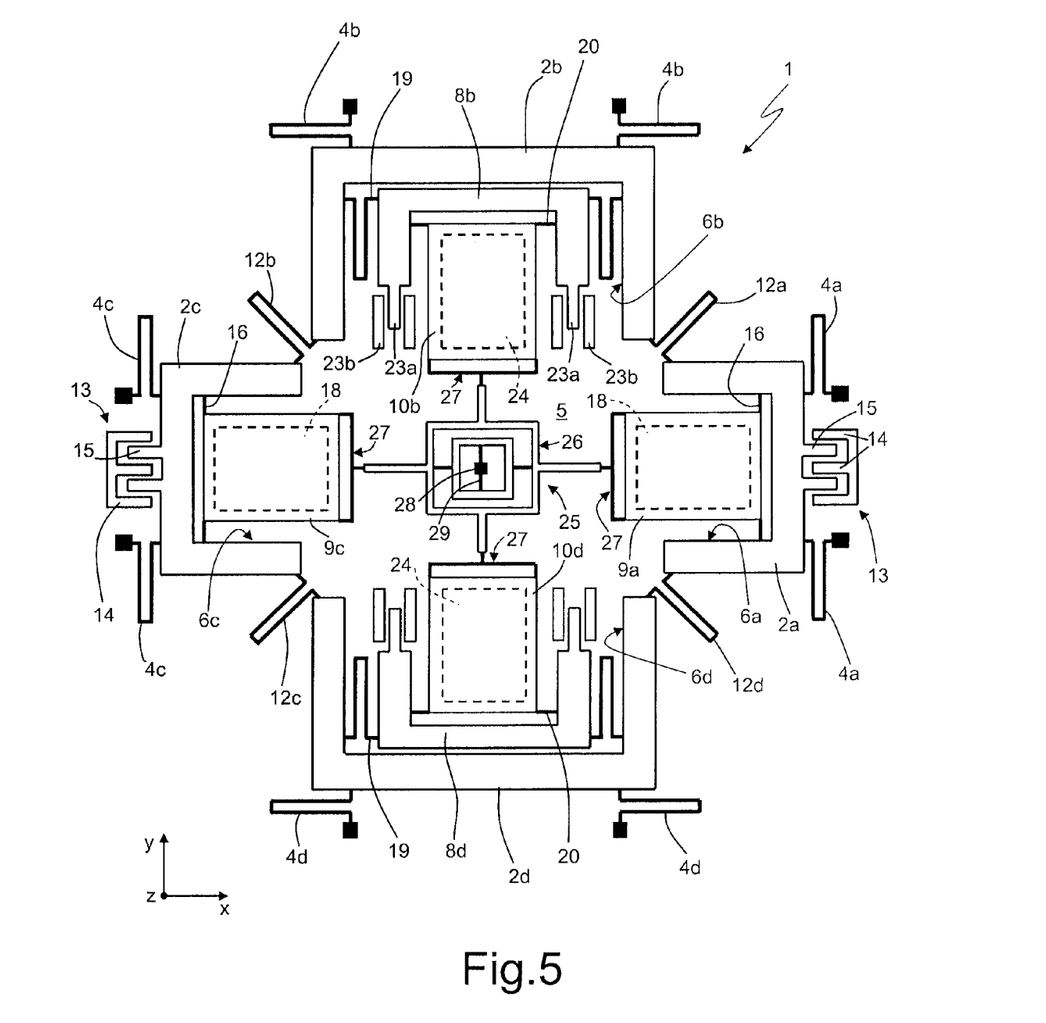
FIG. 5 shows a schematic top plan view of the layout of a triaxial MEMS gyroscope according to a first embodiment of the present disclosure.

As illustrated in FIG. 5, in a first embodiment of the MEMS gyroscope 1 the driving masses 2a-2d have a frame conformation, shaped like a "U" or like a "U" turned over or upside down, defining inside them a respective housing opening 6a-6d, open towards the empty space 5, which is set centrally with respect to the entire micromechanical structure. Each driving mass 2a-2d is anchored to an underlying substrate (here not illustrated) of the MEMS gyroscope 1 by means of a pair of elastic anchorage elements 4a-4d, of the folded type, designed to enable movement only in the respective driving direction. The driving masses 2a-2d are moreover coupled to one another by means of the elastic coupling elements 12a-12d, substantially according to the scheme described for the micromechanical structure of FIG. 1.

A respective assembly 13 of driving electrodes is coupled to the first and third driving masses 2a, 2c to cause driving movement thereof along the first axis x (it is in any case evident that, alternatively or additionally, similar driving assemblies 13 can be coupled to the second and fourth driving masses 2b, 2d).

Each driving assembly 13 comprises fixed driving electrodes 14, fixed with respect to the substrate (not shown), and mobile driving electrodes 15, coupled to the respective driving mass 2a, 2c. The fixed and mobile driving electrodes 14, 15 are arranged in combfingered configuration and are capacitively coupled to one another so as to generate, when appropriately biased, a mutual attraction/repulsion and cause movement of the respective driving mass 2a, 2c along the first horizontal axis x.

In greater detail, the first and third driving masses 2a, 2c are mechanically coupled to a respective roll-sensing mass 9a, 9c, having a substantially rectangular shape in the horizontal plane xy (elongated along the first horizontal axis x), by means of first elastic supporting elements 16 (of a rectilinear type and extending along the second horizontal axis y). The first elastic supporting elements 16 extend starting from one end of the respective roll-sensing mass 9a, 9c (the body of which extends consequently in cantilever fashion from the same first elastic supporting elements 16) in such a way that the roll-sensing mass 9a, 9c is free to rotate out of the horizontal plane xy about an axis defined by the elastic supporting elements 16, thus varying a distance with respect to an associated roll-sensing electrode 18, set on the substrate, underneath the roll-sensing mass 9a, 9c (hence causing a resulting capacitive variation).

The second and fourth driving masses 2b, 2d are mechanically coupled to a respective yaw-sensing mass 8b, 8d, having substantially the shape of a "U" frame in the horizontal plane xy, by means of second elastic supporting elements 19 (of a folded type with axis of extension along the second horizontal axis y). Respective yaw-sensing mobile electrodes 23a are moreover associated to each yaw-sensing mass 8b, 8d, and capacitively coupled to respective yaw-sensing fixed electrodes 23b (the latter being fixed with respect to the substrate).

A respective pitch-sensing mass 10b, 10d is moreover arranged within the housing opening 6b, 6d of the second and fourth driving masses 2b, 2d, for example, having a substantially rectangular shape in the plane xy (elongated along the second horizontal axis y); the pitch-sensing masses 10b, 10d are elastically connected to a respective yaw-sensing mass 8b, 8d by means of third elastic supporting elements 20, of a rectilinear type and extending along the first horizontal axis x. It may be noted that the pitch-sensing masses 10b, 10d are hence coupled to the respective driving mass 2b, 2d by interposition of a respective yaw-sensing mass 8b, 8d (an appropriate stiffness of the corresponding third elastic supporting elements 20 in regard to the driving motion being envisaged for this purpose). The pitch-sensing masses 10b, 10d extend in cantilever fashion from the respective third elastic supporting elements 20, and face, each, an associated pitch-sensing electrode 24, set on the substrate underneath the same pitch-sensing mass 10b, 10d. It is in any case evident that further yaw-sensing masses (previously designated by the references 8a, 8c) could be provided, aligned along the first horizontal axis x, instead of, or in addition to, the yaw-sensing masses 8b, 8d aligned along the second axis y.

As mentioned previously, the MEMS gyroscope 1 further comprises a central coupling structure 25, set centrally in the empty space 5 to obtain an elastic coupling of the various sensing masses such as to only allow the movements in phase opposition and inhibit the movements in phase of the sensing masses of each pair (each pair of sensing masses being designed for sensing a respective angular velocity about a respective sensing axis).

As described in detail in the aforesaid U.S. patent application Ser. No. 12/776,178, the central coupling structure 25 is configured so as to define a rigid connection element 26 having a first end connected to a first sensing mass of a pair and a second end, opposite to the first, connected to the second sensing mass of the same pair, by means of respective first elastic hinge elements 27.

The rigid connection element 26, which can ideally be considered as infinitely rigid in regard to bending, has, at an intermediate portion thereof between the same sensing masses of one and the same pair, for example, a central portion thereof, a point of constraint with respect to the sensing movement (i.e., which is forced to remain substantially immobile to translation during the movement of the sensing masses). In particular, the aforesaid intermediate portion is hinged to the substrate of the MEMS gyroscope 1, in particular in a central anchorage 28 at the aforesaid point of constraint, by means of second elastic hinge elements 29. It is to be noted that FIG. 5 illustrates a possible embodiment of the rigid connection element 26; however, it is clear that other embodiments are equally possible.

The first and second elastic hinge elements 27, 29 are configured so as to hinge ideally the rigid connection element 26 centrally to the substrate, and, at its ends, to the sensing masses of each pair, consequently performing substantially the function of hinges, which are ideally assumed not to have any torsional stiffness and not to be compliant (i.e., have an infinite stiffness) to translation. The first and second elastic hinge elements 27, 29 are hence configured in such a way as to enable rotations, but not translations (along the first horizontal axis x or second horizontal axis y), of the rigid connection element 26, with respect to the point of constraint with the substrate or to the respective sensing masses.

In particular, in order to implement the first and second elastic hinge elements 27, 29 (having a hinge function at the respective hinge points) a solution is adopted consisting in the use of two springs, possibly folded, having a longitudinal extension (along the first horizontal axis x or the second horizontal axis y), which are set one as prolongation of the other starting from the respective hinge point, so as to work in bending in the horizontal plane xy (the plane of the sensor) or in torsion during the motion in phase opposition of the sensing masses, and in tension/compression or bending out of the horizontal plane xy during the in-phase motion. The behavior of this pair of flexible elements approximates very closely that of a hinge positioned in the point of contact of the ends in common of the springs with longitudinal extension given that these springs have a stiffness in regard to deformations of tension/compression/bending out of the plane much higher than the stiffness in regard to deformations of bending in the plane/torsion.

In use, thanks to the configuration of the first and second elastic hinge elements 27, 29 and to their elastic deformation (of bending in the horizontal plane xy, or torsion out of the horizontal plane xy), the rigid connection element 26 is free to rotate about the central point of constraint (the central anchorage 28) both in the horizontal plane xy, in such a way as to enable the movement in phase opposition along the first horizontal axis x of the yaw-sensing masses 8b, 8d, and out of the same horizontal plane xy, in such a way as to enable the movements in phase opposition of the roll-sensing masses 9a, 9c and of the pitch-sensing masses 10b, 10d.

Instead, the configuration of the first and second elastic hinge elements 27, 29 is such that the rigid connection element 26 is unable to translate either in the horizontal plane xy or along the vertical axis z, thus hindering the movements in phase of the sensing masses.

In a second embodiment (see FIG. 6), in order to improve usage of space and to simplify the micromechanical structure of the MEMS gyroscope, here designated by 1', the driving masses 2a-2d coincide also with the various sensing masses (in other words, the driving masses 2a-2d are also able to execute, in addition to the respective driving movements, one or more sensing movements in order to enable sensing of respective angular velocities). In this case, the number of elastic elements present in the structure is reduced, but these elastic elements have in any case to enable all the movements useful for operation of the MEMS gyroscope 1', and to reject as much as possible the spurious vibration modes. Also in this embodiment, a scheme of the driving movements is implemented as described previously for the micromechanical structure of FIG. 1.

Figure 6:
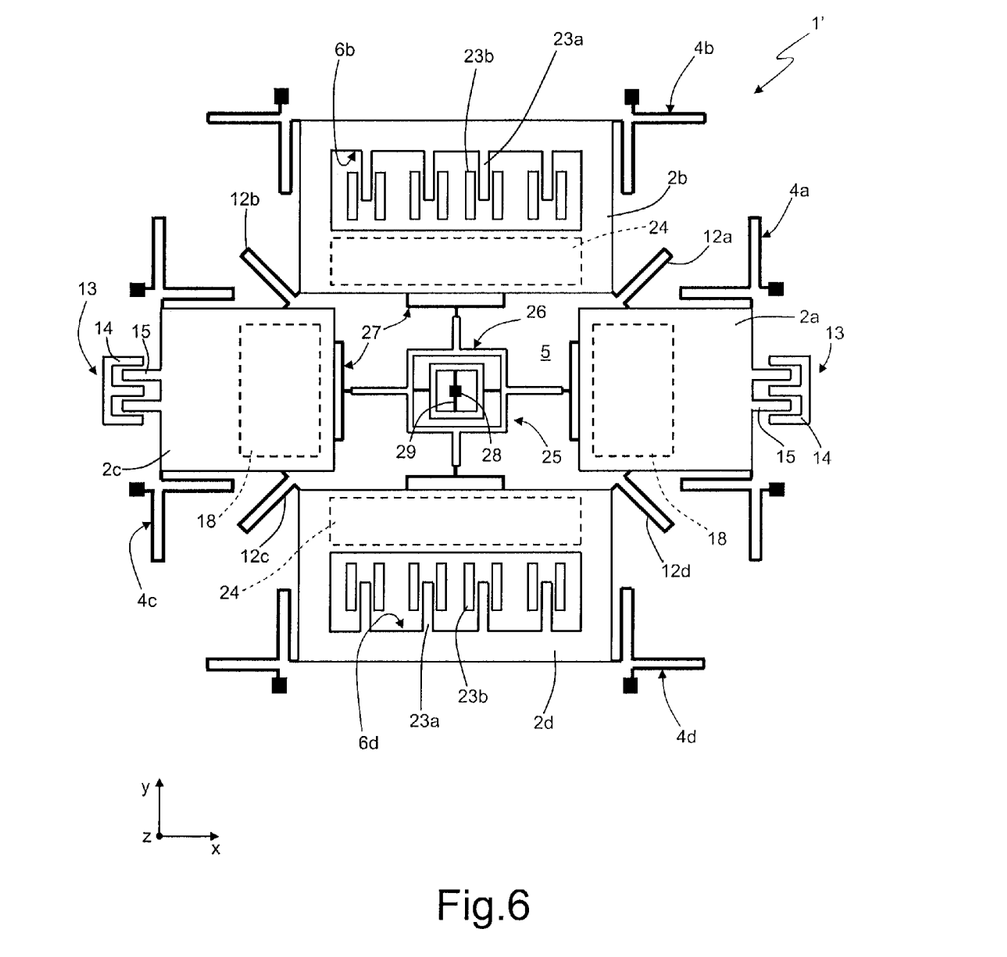
FIGS. 6 and 7 show schematic top plan views of the layout of a triaxial MEMS gyroscope according to further embodiments of the present disclosure.

In detail, and as illustrated in FIG. 6, the first and third driving masses 2a, 2c have in this case a full rectangular shape in the horizontal plane xy, and face a respective roll-sensing electrode 18, set on top of the substrate (not illustrated). The respective first and third elastic anchorage elements 4a, 4c are in this case configured in such a way as to allow both the driving movement along the first horizontal axis x and the sensing movement along the vertical axis z. In particular, the elastic anchorage elements 4a, 4c are, for example, constituted by two springs of a folded type set orthogonal to one another: a first spring, with axis of extension along the second horizontal axis y has a first end coupled to a respective anchorage to the substrate; and a second spring, with axis of extension along the first horizontal axis x has a respective first end coupled to the respective driving mass 2a, 2c (the two springs moreover have respective second ends in common).

The second and fourth driving masses 2b, 2d also have a substantially rectangular shape in the horizontal plane xy, but define inside them a respective housing opening 6b, 6d, set within which are yaw-sensing mobile electrodes 23a (fixed with respect to the respective driving mass 2b, 2d) and yaw-sensing fixed electrodes 23b (fixed with respect to the substrate). The second and fourth driving masses 2b, 2d moreover face a respective pitch-sensing electrode 24, set on the substrate. The respective second and fourth elastic anchorage elements 4b, 4d are obtained substantially as the first and third elastic anchorage elements 4a, 4c, and are in this case configured in such a way as to allow both the driving movement along the second horizontal axis y and the pitch-sensing movement along the vertical axis z and yaw-sensing movement along the first horizontal axis x.

A third embodiment, illustrated in FIG. 7, once again envisages that at least some of the driving masses (for example, the second and fourth driving masses 2b, 2d) coincide with the sensing masses (substantially as described with reference to FIG. 6), and moreover envisages decoupling of the driving electrodes from the sensing masses in such a way as to reduce the driving disturbance on the reading of the angular velocity to be measured (for example the yaw angular velocity), albeit generating the desired force in the driving direction.

Figure 7:
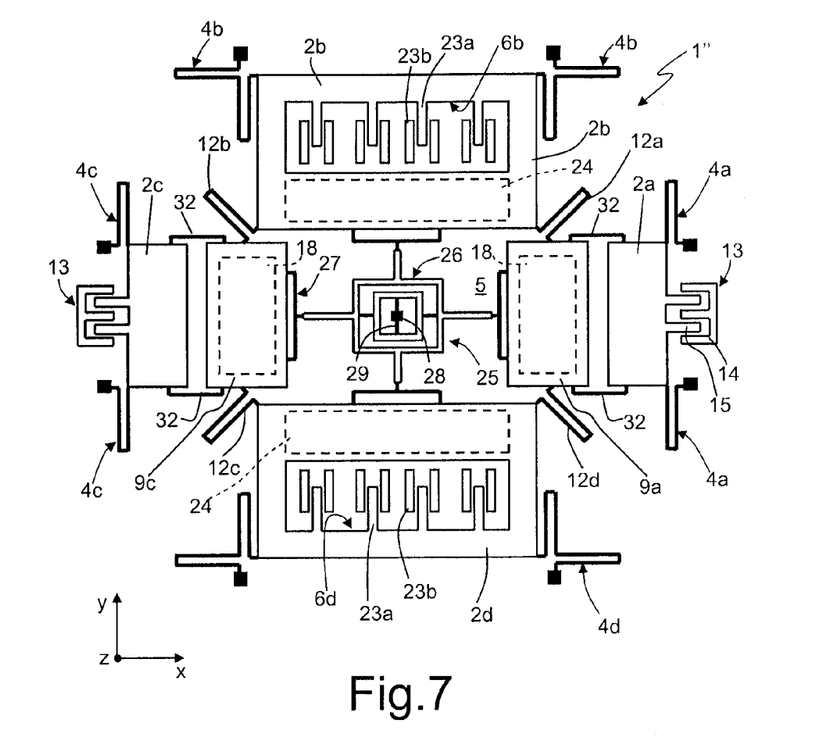

In the MEMS gyroscope, here designated by 1", the first and third driving masses 2a, 2c (which have, for example, a full rectangular shape in the horizontal plane xy) are connected to the respective first and third sensing masses 9a, 9c by means of elastic decoupling elements 32, having an axis of extension oriented along the first horizontal axis x. The elastic coupling elements 12a-12d are in this case directly connected to the first and third sensing masses 9a, 9c and to the second and fourth driving masses 2b, 2d (the latter also performing the function of sensing masses).

The elastic decoupling elements 32 are rigid as regards the driving movement along the first horizontal axis x so that the driving masses 2a, 2c draw in motion the respective sensing masses 9a, 9c, which, in turn, set in motion the second and fourth driving masses 2b, 2d, which are mechanically coupled thereto by means of the elastic coupling elements 12a-12d.

In addition, the elastic decoupling elements 32 substantially enable decoupling of the yaw-sensing movement of the second and fourth driving masses 2b, 2d from the driving movement by limiting, during the yaw-sensing oscillation, the movement of the driving electrodes (of the assemblies 13 of driving electrodes). The elastic decoupling elements 32 thus enable rejection of the possible undesirable force caused by the same driving electrodes in the yaw-sensing direction (in other words, preventing the driving force from being able to excite the mode of yaw-sensing vibration in the horizontal plane xy). In particular, in the presence of the yaw-sensing movement, a movement of rotation about a corresponding center of gravity is allowed to the driving electrodes by the elastic decoupling elements 32, i.e., a movement such as not to cause disturbance in sensing of the yaw angular velocity.

In a way not illustrated, by means of appropriate elastic decoupling elements it may moreover be possible, whenever necessary, to obtain in a similar way also decoupling of the driving movement from the out-of-plane sensing movements (roll-sensing and pitch-sensing movements).

The advantages of the MEMS gyroscope according to the present disclosure emerge clearly from the foregoing description.

In particular, it is once again emphasized that the particular solution of mechanical coupling of the driving masses enables implementation of a single mode of driving vibration, which is able to set in motion all the mobile driving and sensing masses. In the driving electronics, only a single feedback control loop for control of the oscillations is consequently present. In addition to the greater constructional simplicity, the presence of a single driving control loop enables elimination of disturbances, which could otherwise occur between a number of control loops at frequencies close to one another.

The micromechanical structure illustrated enables coupling of all the mobile masses in such a way that it is substantially insensitive to the main external disturbances (for example due to environmental noise or noise of other nature), and enable only the modes of vibration useful for reading of the angular velocities.

The micromechanical structure described is extremely compact, enabling a triaxial MEMS gyroscope to be obtained in integrated technology, in which the occupation of space is reduced to the minimum.

Figure 8:
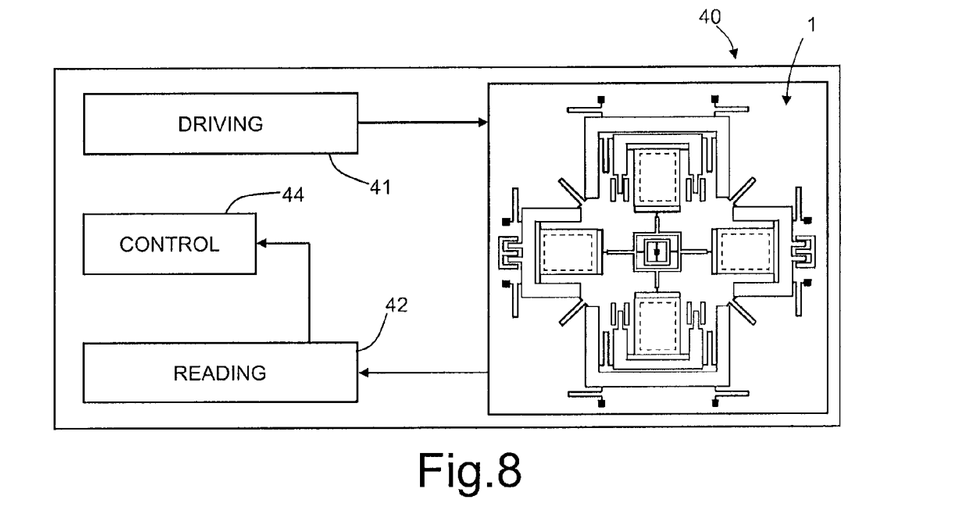
FIG. 8 shows a simplified block diagram of an electronic device provided with a MEMS gyroscope according to yet a further aspect of the present disclosure.

Basically, the aforesaid characteristics make the MEMS gyroscope 1, 1', 1" particularly indicated for integration in an electronic device 40, as illustrated in FIG. 8, which can be used in a plurality of electronic systems, for example in inertial navigation systems, in automotive systems or in systems of a portable type, such as for example: a PDA (Personal Digital Assistant); a portable computer; a cell phone; a digital audio player; a photographic camera; or a video camera. The electronic device 40 is generally able to process, store, transmit and receive signals and information.

The electronic device 40 comprises: a driving circuit 41, configured for imparting the driving motion on the various driving masses 2a-2d, and supplying biasing signals to the micro electromechanical structure (in a known way, which is not illustrated in detail here); a reading circuit 42, operatively coupled to sensing capacitors associated to the mobile masses, for detecting the amount of displacement of the same mobile masses and hence determining the angular velocities acting on the structure; and an electronic control unit 44, for example, a microprocessor, a microcontroller or similar computing tool, connected to the reading circuit 42 and designed to supervise general operation of the electronic device 40, for example on the basis of the angular velocities detected and determined.

Finally, it is clear that modifications and variations may be made to what has been described and illustrated herein, without thereby departing from the scope of the present disclosure.

In particular, it is evident that the solution described to obtain the elastic coupling elements between the driving masses is not to be understood as limiting, and that further solutions can be equally envisaged for this purpose. In particular, a greater or smaller number of springs could be provided, and/or in some constructional cases, springs with different geometry and/or different inclination with respect to the first horizontal axis x and to the second horizontal axis y could be used.

In some cases, for example in order to optimize the available spaces, it could moreover be possible to set the two principal axes of the driving motion inclined by a certain angle (for example 45°) with respect to the horizontal axes x, y. Evidently, the elastic coupling elements 12a-12d can also be arranged at an inclination angle other than 45°, obtaining in any case the desired mechanical coupling (with a ratio of transmission of the driving movements different from the ideal ratio of 1:1). In this regard, it is emphasized that the structure described can enable a movement of equal or different amplitude between the driving masses arranged along the first and second horizontal axes x, y, according, for example, to design requirements.

In addition, the arrangement and configuration of the driving and sensing electrodes may vary with respect to what has been illustrated and described previously (for example, the single assembly 13 of driving electrodes could be present).

Even though the layouts of the micromechanical structure of the MEMS gyroscope illustrated herein envisage a movement of the driving masses substantially as discussed with reference to FIG. 1, it is evident that the same considerations may apply in the case of different movements of the driving masses (and different configurations of the elastic coupling elements 12a-12d).

In addition, in a known way, the displacement of the mobile masses can be obtained with a technique other than the capacitive technique, for example by sensing of a magnetic force, and the driving motion can be generated in a different way, for example by means of parallel-plate electrodes, or else by magnetic actuation.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated MEMS gyroscope, comprising:
an assembly of driving electrodes;
a first driving mass configured to be driven to have a first driving movement along a first axis in response to biasing of the assembly of driving electrodes, said first driving movement being configured to generate a first sensing movement, in response to rotations of said integrated MEMS gyroscope;
a second driving mass configured to be driven to have a second driving movement along a second axis, said second axis being transverse to said first axis, said second driving movement being coupled to the first driving movement such that the second driving mass is configured to be driven by the first driving movement of the first driving mass, the second driving movement being configured to generate a second sensing movement, in response to the rotations of said integrated MEMS gyroscope; and
a first elastic coupling element configured to elastically couple said first driving mass to said second driving mass and to couple said first driving movement to said second driving movement with a ratio of movement.

2. The gyroscope according to claim 1, wherein:
said first driving movement is configured to generate, as a result of a Coriolis force, the first sensing movement includes:
a first yaw sensing movement along said second axis, in response to the rotations of said integrated MEMS gyroscope about a third axis orthogonal to said first axis and said second axis at a yaw angular velocity; and
a roll sensing movement along said third axis, in response to the rotations of said integrated MEMS gyroscope about said second axis at a roll angular velocity; and
said second driving movement is configured to generate, as a result of a Coriolis force, the second sensing movement includes:
a second yaw sensing movement along said first axis in response to the rotations of said integrated MEMS gyroscope about said third axis at said yaw angular velocity; and
a pitch sensing movement along said third axis, in response to the rotations of said integrated MEMS gyroscope about said first axis at a pitch angular velocity.

3. The gyroscope according to claim 1, wherein said first elastic coupling element is configured to draw said second driving mass along by said first driving mass as the first driving mass moves with the first driving movement.

4. The gyroscope according to claim 1, wherein said first elastic coupling element has an axis of extension in a direction inclined by an inclination angle, of non-zero value, with respect to said first axis, and is configured to transmit a relative movement between said first driving mass and said second driving mass along said axis of extension.

5. The gyroscope according to claim 4, wherein said inclination angle is 45°, and said ratio of movement is substantially a ratio of 1:1 where a displacement of said first driving mass corresponds to a substantially equal displacement of said second driving mass.

6. The gyroscope according to claim 1, wherein said first elastic coupling element is folded.

7. The gyroscope according to claim 1, wherein said first elastic coupling element is configured to enable said first and second driving movements to be oscillatory movements, synchronous with one another.

8. The gyroscope according to claim 1, wherein said assembly of driving electrodes is connected only to said first driving mass and not to said second driving mass.

9. The gyroscope according to claim 1, further comprising:
a substrate;
first elastic anchorage elements coupled between said first driving mass and the substrate of said integrated MEMS gyroscope, the first elastic anchorage elements being configured to constrain said first driving mass to perform said first driving movement along said first axis; and
second elastic anchorage elements coupled between said second driving mass and said substrate, the second elastic anchorage elements being configured to constrain said second driving mass to perform said second driving movement along said second axis.

10. The gyroscope according to claim 9, further comprising:
third elastic anchorage elements;
a third driving mass configured to be driven to have a third driving movement along said first axis in response to said assembly of driving electrodes, the third driving mass being anchored to said substrate by said third elastic anchorage elements;
fourth elastic anchorage elements;
a fourth driving mass configured to be driven to have a fourth driving movement along said second axis, the fourth driving mass being anchored to said substrate by said fourth elastic anchorage elements, the fourth driving movement coupled to the first and third driving movements such that the fourth driving mass is configured to be driving by the first and third driving movements; and
second elastic coupling elements configured, together with said first elastic coupling element, to elastically couple said first, second, third, and fourth driving masses so that said first and third driving movements are synchronous and in phase opposition with respect to one another, and said second and fourth driving movements are synchronous and in phase opposition with respect to one another.

11. The gyroscope according to claim 10, wherein said second and said fourth elastic anchorage elements are configured to enable said second driving mass and fourth driving mass, respectively, to perform the second sensing movement and a fourth sensing movement, respectively, in response to the rotations of said integrated MEMS gyroscope at the angular velocity.

12. The gyroscope according to claim 11, further comprising a sensing coupling structure configured to couple said second driving mass and said fourth driving mass elastically to one another, wherein said second and fourth sensing movements of the second and fourth driving masses are in phase opposition with respect to one another and are configured to inhibit in-phase movements of said second driving mass and said fourth driving mass.

13. The gyroscope according to claim 12, wherein said sensing coupling structure comprises:
a rigid element configured to connect said second driving mass and said fourth driving mass to one another, having a point of constraint in a position intermediate between the second driving mass and the fourth driving mass; and a third elastic coupling element configured to connect respective ends of said rigid element to said second driving mass and said fourth driving mass;
said point of constraint being substantially immobile in regard to translation.

14. The gyroscope according to claim 10, wherein said second elastic anchorage element and said fourth elastic anchorage element are configured to enable said second driving mass and said fourth driving mass, respectively, to perform a first pitch sensing movement and a second pitch sensing movement along said third axis in response to the rotations of said integrated MEMS gyroscope about said first axis at a pitch angular velocity, and a first yaw sensing movement and a second yaw sensing movement along said first axis in response to the rotations of said integrated MEMS gyroscope about said third axis at a yaw angular velocity.

15. The gyroscope according to claim 11, further comprising a first sensing mass coupled to said first driving mass via elastic decoupling elements, and to said second driving mass via said first elastic coupling element; wherein said elastic decoupling elements are rigid in regard to said first driving movement and are configured to decouple said second sensing movement of said second driving mass and said fourth sensing movement of said fourth driving mass from said first driving movement.

16. The gyroscope according to claim 1, further comprising:
first elastic supporting elements;
second elastic supporting elements;
a first sensing mass elastically coupled to the first driving mass with the first elastic supporting elements, the first sensing mass being fixed with respect to the first driving mass in the first driving movement, the first sensing mass having a first degree of freedom of movement in order to execute the first sensing movement; and
a second sensing mass elastically coupled to said second driving mass with the second elastic supporting elements, the second sensing mass being fixed with respect to the second driving mass in the second driving movement, the second sensing mass having a second degree of freedom of movement in order to execute the second sensing movement.

17. An electronic device, comprising:
an integrated MEMS gyroscope including:
an assembly of driving electrodes;
a first driving mass; configured to move in a first driving direction along a first axis in response to biasing of the assembly of driving electrodes, said first driving mass being configured to generate a first sensing movement, in response to rotations of said integrated MEMS gyroscope;
a second driving mass; configured to move in a second driving direction along a second axis in response to the first driving mass such that the second driving mass is configured to be driven by movement of the first driving mass, said second axis being transverse to said first axis, said second driving mass being configured to generate a second sensing movement, in response to the rotations of said integrated MEMS gyroscope; and
a first elastic coupling element configured to elastically couple said first driving mass to said second driving mass in order to enable the first driving mass to move in the first driving direction and to enable the first driving mass to move the second driving mass in the second driving direction in a ratio of movement; and a driving stage coupled to said integrated MEMS gyroscope and configured to supply electrical biasing signals to said assembly of driving electrodes to drive said first driving mass.

18. The device according to claim 17 wherein said driving stage includes a single feedback control loop configured to drive said first driving mass.

19. The device according to claim 18 wherein the first and second driving masses move in response to a single driving motion.

20. The device according to claim 17 wherein the first sensing movement is transverse to the first driving direction and the second sensing movement is transverse to the second driving direction.

21. The device according to claim 17 wherein the first driving mass includes a first yaw sensing mass and a roll sensing mass and the second driving mass includes a second yaw sensing mass and a pitch sensing mass.

22. A MEMS gyroscope, comprising:
a driving electrode;
a first driving mass configured to move in a first driving direction along a first axis in response to the driving electrode;
a second driving mass configured to move in a second driving direction along a second axis, the second axis being transverse to the first axis; and
a first elastic coupling element coupled between the first driving mass and the second driving mass, the first elastic coupling element being configured to drive the second driving mass in the second driving direction in response to movement of the first driving mass in the first driving direction in response to the driving electrode.

23. The gyroscope of claim 22 wherein the first driving mass includes a first yaw sensing mass and a first roll sensing mass and the second driving mass includes a second yaw sensing mass and a first pitch sensing mass.

24. The gyroscope of claim 23 wherein the first yaw sensing mass is configured to generate a first sensing movement in response to the rotations of the gyroscope, the first roll sensing mass is configured to generate a second sensing movement in response to the rotations of the gyroscope, the second yaw sensing mass is configured to generate a third sensing movement in response to rotations of the gyroscope, and the first pitch sensing mass is configured to generate a fourth sensing movement in response to the rotations of the gyroscope.

25. A method, comprising:
forming a MEMS gyroscope, the forming including:
forming a driving electrode;
forming a first driving mass having a first yaw sensing mass and a first roll sensing mass, the first driving mass being configured to move in a first driving direction along a first axis in response to the driving electrode;
forming a second driving mass having a second yaw sensing mass and a first pitch sensing mass, the second driving mass being configured to move in a second driving direction along a second axis transverse to the first axis; and
forming an elastic coupling element between the first and second driving masses, the elastic coupling element configured to drive the second driving mass in the second driving direction in response to a first driving movement of the first driving mass in the first driving direction.

26. The method of claim 25, further comprising forming a driving electrode electrically coupled to the first driving mass and configured to move the first driving mass in the first driving direction.

27. The method of claim 26 wherein the first driving movement is configured to generate a first sensing movement of the first yaw sensing mass in response to the rotations of the MEMS gyroscope, a second sensing movement of the first roll sensing mass in response to the rotations of the MEMS gyroscope, a third sensing movement of the second yaw sensing mass in response to the rotations of the MEMS gyroscope, and a fourth sensing movement of the first pitch sensing mass in response to rotations of the MEMS gyroscope.

\* \* \* \* \*

UNITED STATES PATENT AND TRADEMARK OFFICE
CERTIFICATE OF CORRECTION

PATENT NO.        : 8,459,110 B2
APPLICATION NO.   : 12/975979
DATED             : June 11, 2013
INVENTOR(S)       : Gabriele Cazzaniga et al.

Page 1 of 1

It is certified that error appears in the above-identified patent and that said Letters Patent is hereby corrected as shown below:

Title Page, References Cited

Col. 2, Item (56):
"6,766,689 B2* 7/2004 Gardella et al. ... 73/504.04" should read, --6,766,689 B2* 7/2004 Spinola Durante et al. ... 73/504.04--.

Page 2, Item (56):
"2010/0186507 A1  G ünthner et al." should read, --2010/0186507 A1  Günthner et al--.

In the Claims

Column 15, Line 46, Claim 17:
"a first driving mass; configured to move in a first driving" should read, --a first driving mass configured to move in a first driving--.

Column 15, Line 52, Claim 17:
"a second driving mass; configured to move in a second" should read, --a second driving mass configured to move in a second--.

Signed and Sealed this
Seventh Day of January, 2014

Margaret A. Focarino
*Commissioner for Patents of the United States Patent and Trademark Office*